United States Patent [19]
Tasdighi et al.

[11] Patent Number: 5,734,291
[45] Date of Patent: Mar. 31, 1998

[54] POWER SAVING TECHNIQUE FOR BATTERY POWERED DEVICES

[75] Inventors: Ali Tasdighi, San Jose; Jerry M. Collings, Santa Clara, both of Calif.

[73] Assignee: TelCom Semiconductor, Inc., Mountain View, Calif.

[21] Appl. No.: 613,999

[22] Filed: Mar. 11, 1996

[51] Int. Cl.$^6$ ........................................................ G05F 3/02
[52] U.S. Cl. ............................................. 327/537; 327/536
[58] Field of Search .................................. 327/534, 535, 327/536, 537

[56] References Cited

U.S. PATENT DOCUMENTS

| | | | |
|---|---|---|---|
| 4,797,899 | 1/1989 | Fuller et al. | 375/7 |
| 5,258,662 | 11/1993 | Skovmand | 327/544 |
| 5,337,284 | 8/1994 | Cordoba et al. | 327/540 |
| 5,387,228 | 2/1995 | Shelton | 607/11 |
| 5,481,731 | 1/1996 | Conary et al. | 395/750 |
| 5,629,646 | 5/1997 | Menezes et al. | 327/205 |

OTHER PUBLICATIONS

"MAXIM, +5V–Powered Multi–Channel RS–232 Drivers/Receivers MAX220–MAX249", data sheet published by Maxim Integrated Products, Sunnyvale, CA, Jul. 92, pp. 2–53.

"MAXIM, ±10kV, ESD–Protected, +5V RS–232 Transceivers with Receivers Active in Shutdown MAX211E/MAX213E/MAX241E", data sheet published by Maxim Integrated Products, Sunnyvale, CA, Aug. 93, pp. 2–25.

"MAXIM, +5v rs–232 Transceivers With 0.1μF External Capacitors MAX200–MAX211/MAX213", data sheet published by Maxim Integrated Products, Sunnyvale, CA, Jan. 93, pp. 2–5.

"MAXIM, CMOS Monolithic Voltage Converter MAX660", data sheet published by Maxim Integrated Products, Sunnyvale, CA, Mar. 91, pp. 4–117.

"MAXIM, 50 mA, Frequency–Selectable, Switched–Capacitor Voltage Converters MAX860/MAX861", data sheet published by Maxim Integrated Products, Sunnyvale, CA, Jul. 94, pp. 4–235.

"MAXIM, Low–Noise, Regulated, Negative Charge–Pump Power Supplies for GaAs FET Bias MAX850–MAX853", data sheet published by Maxim Integrated Products, Sunnyvale, CA, Mar. 94, pp. 4–215.

*Primary Examiner*—Terry Cunningham
*Attorney, Agent, or Firm*—Skjerven, Morrill, MacPherson, Franklin & Friel; Brian D. Ogonowsky

[57] ABSTRACT

An integrated circuit voltage converter containing a capacitive charge pump performing DC to DC conversion is disclosed which detects, either automatically or by an external signal, the onset of a low power consumption situation and switches to a low power consumption mode. In one embodiment, the low power consumption mode is accomplished by reducing the operating frequency of the charge pump. In another embodiment, the switching transistors used to switch the capacitors in the charge pump during a low power consumption mode are smaller than those transistors used to switch the capacitors during its normal operating mode. In another embodiment, the DC to DC converter switches back and forth between a high frequency (burst) mode and a low frequency (low power) mode at intervals. In another embodiment, a combination of the power reduction techniques is used. Various techniques for detecting when a low power consumption mode is appropriate are also described.

21 Claims, 3 Drawing Sheets

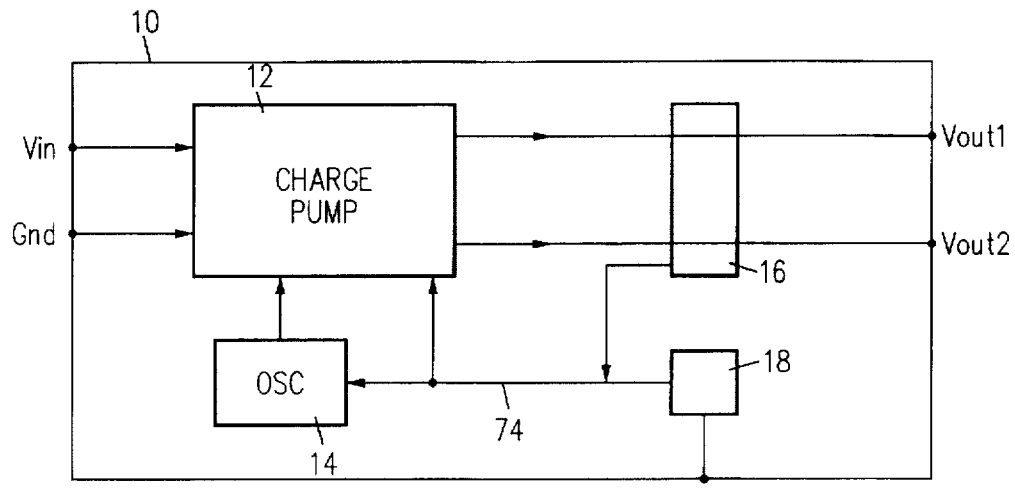
FIG. 1
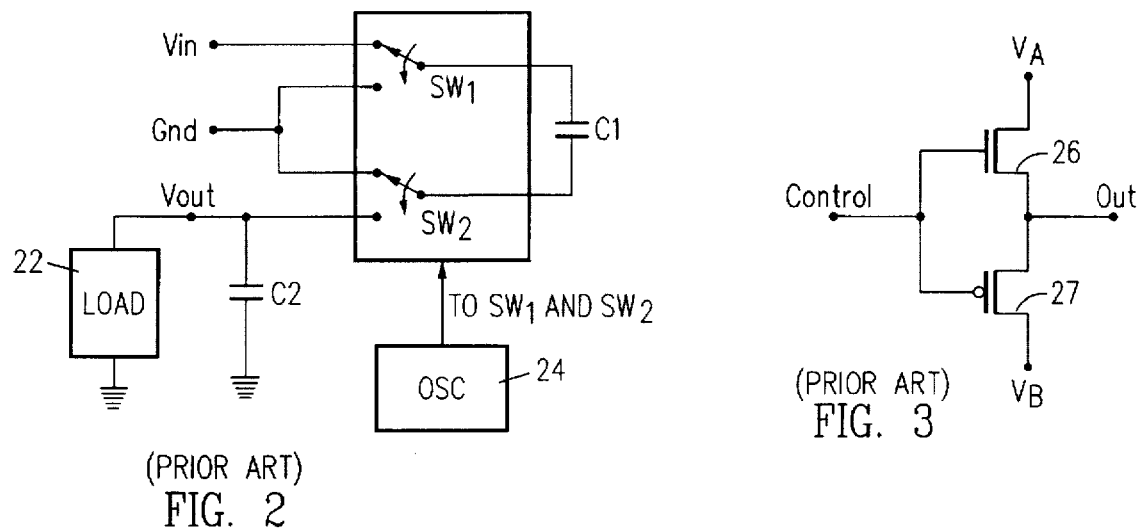
(PRIOR ART)
FIG. 2
(PRIOR ART)
FIG. 3
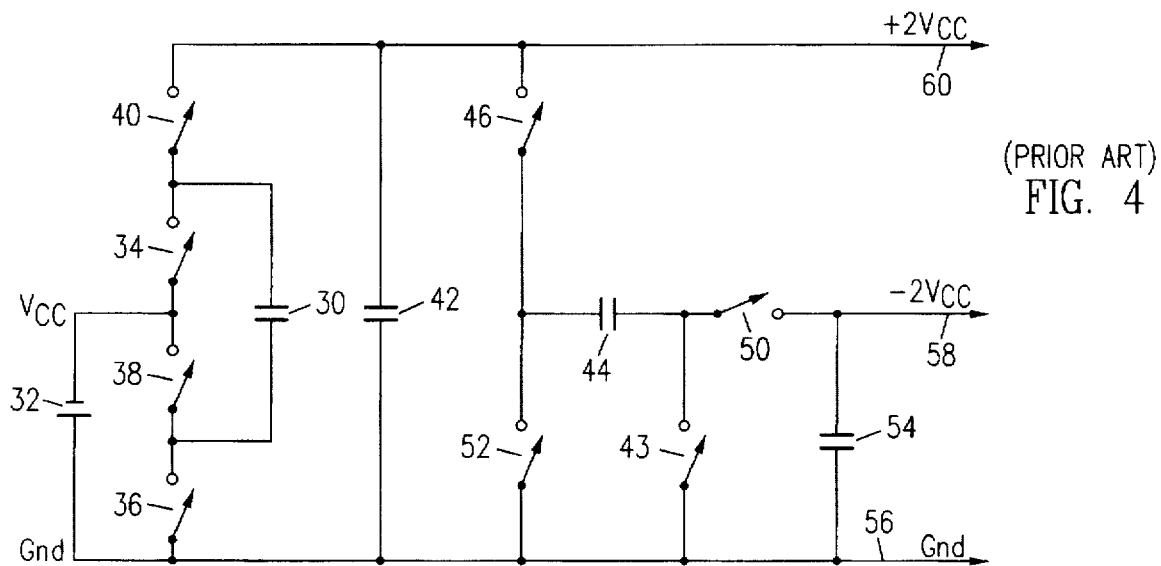
(PRIOR ART)
FIG. 4

POWER SAVING TECHNIQUE FOR BATTERY POWERED DEVICES

FIELD OF THE INVENTION

This invention relates to battery powered electronic devices and, more particularly, to a DC to DC converter having a low power consumption mode.

BACKGROUND OF THE INVENTION

Converters which convert a DC battery voltage to a different DC voltage for connection to circuitry within a device, such as a laptop computer or a portable telephone, are commonly used. The prolonging of battery life is a constant challenge to the designers of such devices.

In such a device powered by a battery connected to a DC to DC converter, battery current is consumed by both the converter and the circuitry connected to the converted voltage. Frequently, the circuitry powered by the converted voltage can be operated in a low-power standby mode, whereby the circuitry is controlled in some fashion to consume low power. Such a standby mode is used in portable telephones while not actively transmitting or receiving and used in laptop computers after a period of nonuse. However, it is common that the voltage converter in these devices continues to operate in its normal fashion and thus still uses considerable power during its operation. Such power consumption in a switching type charge pump is primarily due to the switching transistors' parasitic capacitance charging and discharging at the operating frequency of the converter.

Even during a no-load condition, where the load is disconnected from the charge pump, it is often not desirable to completely shut down the charge pump circuitry due to the relatively long start-up time for the converter to provide a steady state voltage.

What is needed is an integrated DC to DC converter containing a charge pump, where the converter has a low power consumption mode while still providing a converted voltage at its output.

SUMMARY

An integrated circuit voltage converter containing a charge pump performing DC to DC conversion is disclosed which detects, either automatically or by an external signal, the onset of a low power consumption situation and switches to a low power consumption mode.

In one embodiment, the low power consumption mode is accomplished by reducing the operating frequency of the charge pump. In another embodiment, the switching transistors used to switch the capacitors in the charge pump during a low power consumption mode are smaller than those transistors used to switch the capacitors during its normal operating mode. This may be accomplished by switching fewer transistors in parallel in the low power consumption mode. In another embodiment, a combination of the two power reduction techniques is used.

Various techniques for detecting when a low power consumption mode is appropriate are also described.

BRIEF DESCRIPTION OF THE DRAWINGS

FIG. 1 is a block diagram of one embodiment of the DC to DC converter having a low power consumption mode.

FIG. 2 is a schematic diagram of a known charge pump circuit for generating a negative voltage.

FIG. 3 is a conventional CMOS circuit for outputting one of two voltages.

FIG. 4 is a schematic diagram of a known charge pump providing a positive and negative output voltage at double the battery voltage.

DETAILED DESCRIPTION OF THE PREFERRED EMBODIMENTS

FIG. 1 is a block diagram illustrating one embodiment of the invention. In the preferred embodiment, the DC to DC converter 10 is formed as a packaged integrated circuit. The number of pins will depend upon the particular application of the converter. For example, if converter 10 were intended for use in an RS-232 interface application, a separate voltage output pin may be provided for +V and −V. If the capacitors needed in converter 10 were sufficiently large and could not be formed on-chip, then converter 10 would include pins for connection to external capacitors. Such a resulting converter 10 using external capacitors would still be classified as a single chip converter for purposes of this disclosure. Additionally, a battery voltage $V_{IN}$ pin and a battery ground pin are provided on the package. In one embodiment, a low power consumption signal pin P1 is also provided on the package.

Figure 10:
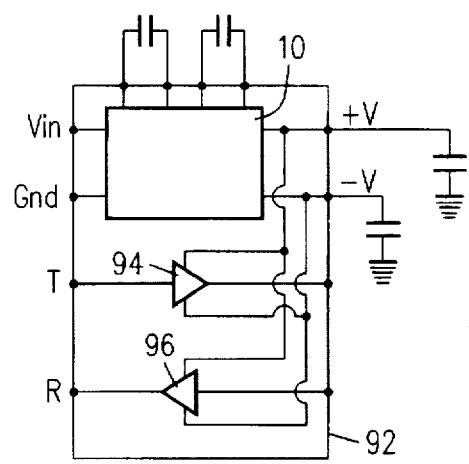
FIG. 10 is a block diagram of an integrated circuit incorporating the novel converter and transmit/receive buffers for use as an RS-232 transceiver.

If the package contained additional circuitry powered by the battery or the converter 10, additional pins may also be needed. Such a package containing converter 10 and additional circuitry may be used as an RS-232 transceiver. The additional circuitry may include buffers which receive an input signal and output the charge pump voltage at an output terminal of the package as illustrated in FIG. 10, to be described later.

The converter 10 of FIG. 1 contains a charge pump 12 whose basic switching operation may be conventional. Examples of two charge pumps are described with respect to FIGS. 2 and 4.

An oscillator 14, whose frequency can be changed in one embodiment, is connected to the charge pump 12 and controls the switching transistors within charge pump 12.

A first detection and logic circuit 16 is shown coupled to the outputs of charge pump 12 to either detect the current being provided by converter 10 or to detect the output voltage of converter 10. Upon detection of a low power consumption condition, logic circuit 16 either controls the switching transistors in charge pump 12 to operate in a low power consumption mode and/or lowers the switching frequency of oscillator 14, as described in greater detail later.

A second detection and logic circuit 18 has a control input connected to an external pin P1 of converter 10. A predetermined logic level signal is applied to pin P1 to signal that converter 10 should be placed into a low power consumption mode. Logic circuit 18 then either controls the switching transistors in charge pump 12 to operate in a low power consumption mode or lowers the switching frequency of oscillator 14. Either or both of logic circuits 16 and 18 may be used while still achieving the purpose of this invention.

FIG. 2 is a prior art charge pump whose basic circuitry may be used in charge pump 12 in FIG. 1. The charge pump of FIG. 2 generates an output voltage $V_{OUT}$ which is a negative of the input battery voltage $V_{IN}$. An external load 22 is powered by the $-V_{IN}$ voltage.

An oscillator 24 operating at virtually any operating frequency, such as 15 KHz to 100 KHz, produces a train of pulses which are applied to control terminals of switching transistors SW1 and SW2. The switching transistors described in this disclosure may be MOS or bipolar transistors. The operation of the charge pump of FIG. 2 is as follows. In a first switch position, illustrated in FIG. 2, capacitor C1 is charged to voltage $V_{IN}$, with its upper terminal connected to $V_{IN}$ and its lower terminal coupled to ground. In a next switching position, under control of oscillator 24, the top terminal of capacitor C1 is connected to ground, and the bottom terminal of capacitor C1 is connected to the top terminal of capacitor C2. The bottom terminal of capacitor C2 is connected to ground. Since the top terminal of capacitor C1 is connected to ground and capacitor C1 is charged to $V_{IN}$, the bottom terminal of capacitor C1 is at a voltage of $-V_{IN}$ and, thus, capacitor C2 becomes charged to this voltage. Capacitor C2 now provides the relatively constant voltage of $-V_{IN}$ to the load 22. Switching transistors SW1 and SW2 are cycled at the frequency of oscillator 24 so that the charge in capacitor C2 is repeatedly replenished as current is drawn by load 22.

Switches SW1 and SW2 may each be a conventional CMOS inverter as shown in FIG. 3, comprising an NMOS transistor 26 and a PMOS transistor 27. As the oscillator 24 voltage applied to the gates of transistors 26 and 27 alternates between a high and low voltage, transistors 26 and 27 couple either a $V_A$ voltage or a $V_B$ voltage to the output of the CMOS circuit.

FIG. 4 illustrates a charge pump circuit which is the subject of U.S. Pat. No. 4,897,774, assigned to Maxim Integrated Products, incorporated herein by reference. The charge pump of FIG. 4 is useful in an RS-232 receiver and transmitter which requires both a positive voltage and a negative voltage to be generated. Referring first to the positive voltage doubler portion of the circuit of FIG. 4, transfer capacitor 30 is charged from voltage source 32 (having a value $V_{cc}$) by closing switches 34 and 36 while switches 38 and 40 remain open during a first phase. During a second phase, switches 34 and 36 are opened and switches 38 and 40 are closed.

When switches 38 and 40 are closed during the second phase, the voltage source 32 is effectively placed in series with the voltage stored across the transfer capacitor 30 and thus the sum of the voltage across voltage source 32 and capacitor 30 is placed across reservoir capacitor 42.

The inverting portion of the voltage doubler circuit operates as follows. Transfer capacitor 44 is charged to the voltage across reservoir capacitor 42 via the switches 46 and 43, which are closed during the first phase of operation of the circuit while switches 50 and 52 remain open. During the second phase of circuit operation, switches 46 and 43 are opened, and the voltage across transfer capacitor 44 is placed across reservoir capacitor 54 via the closing of switches 50 and 52. When the voltage across transfer capacitor 44 is placed across reservoir capacitor 54, the positive end of transfer capacitor 44 is connected to ground line 56 through switch 52, and the negative end of capacitor 44 is connected to the side of reservoir capacitor 54 connected to $-2V_{cc}$ output line 58. The polarity of the voltage across reservoir capacitor 54 with respect to ground line 56 is such that the voltage across reservoir capacitor 54 is negative. The output of reservoir capacitor 42 is connected to $+2V_{cc}$ output line 60.

The first and second phases of the circuit operation described above are repeated at a typical frequency which may range from approximately 100 Hz to greater than 100 KHz for a metal gate 10 volt charge pump device.

In the charge pumps of FIGS. 2 and 4, it takes several phase cycles before the desired output voltage is achieved.

The anticipated load connected to the outputs of the charge pumps of FIGS. 2 and 4 affects the design of the charge pump in that larger capacitors may be used to provide a higher current to the load. Such capacitors may be connected external to the integrated circuit converter 10. Higher switching frequencies also supply a higher current to the load.

In the present invention, the charge pumps of FIGS. 2 and 4, as well as any other conventional charge pump, may generally be used as charge pump 12 in FIG. 1, as modified by the teachings herein to allow the charge pump to be operated in both a normal operating mode and a low power consumption mode. FIGS. 5-9 illustrate modifications to the conventional charge pumps which enable these charge pumps to operate in either a normal operating mode or a low power consumption mode.

Figure 5:
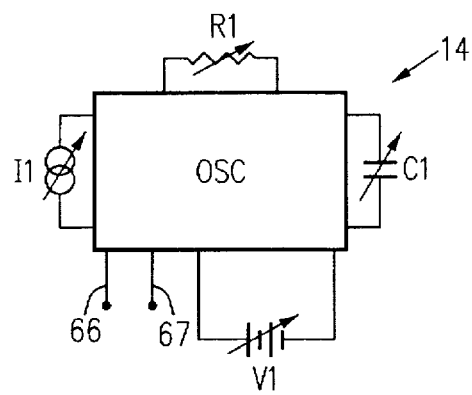
FIG. 5 is a diagram of an oscillator whose frequency may be adjusted by changing any one of a number of parameters.

FIG. 5 illustrates an oscillator circuit 14 which can be used in FIG. 1. Oscillator 14 may use conventional techniques to generate a oscillating frequency across terminals 66 and 67. One skilled in the art would understand the numerous varieties of oscillators which may be used in this invention. In conventional oscillators, the frequency of oscillation can be changed by changing the value of a resistor, a capacitor, a current source, a voltage source, or a combination of these components of the oscillator. In oscillators which use an RC feedback path to control the frequency of oscillation, the frequency is related to 1/RC.

In FIG. 5, the output frequency of oscillator 14 may be lowered by changing the value of either capacitance C1, resistor R1, current source I1, or voltage source V1. These parameter values can be changed by making any one of the components variable or by placing additional components in parallel or in series with the components shown in FIG. 5. It should be understood that changing any parameter of oscillator 14 to adjust the oscillator frequency is envisioned for this invention.

Any one of the parameters in oscillator 14 is controllable by a control signal, as shown in FIG. 1 on line 74, which is generated by either logic circuit 16 or logic circuit 18. The parameters are controlled to place oscillator 14 in a low frequency mode when logic circuit 16 or logic circuit 18 detects that a low power consumption mode for the DC to DC converter 10 should be initiated. The reduction in the oscillator frequency reduces the switching frequency of all the switching transistors in charge pump 12, such as those switching transistors in the charge pumps of FIGS. 2 and 4. Hence, the frequency of the charging and discharging of the parasitic capacitances in the various switching transistors is reduced. This reduces the power consumption of the charge pump 12, but also reduces the amount of current the charge pump 12 can deliver to a load.

In one embodiment, the control signal on line 74 controls oscillator 14 to reduce its output frequency to 1/100 the normal operating frequency of the oscillator; however, other ratios are also suitable, depending on the expected load during the low power mode. The low power frequency and normal operating frequency should be set depending on the particular application. In one embodiment, the frequency of oscillator 14 is switched from a frequency of 10 KHz–100 KHz in the normal mode to 100 Hz to 1 KHz in the low power consumption mode.

Figure 6:
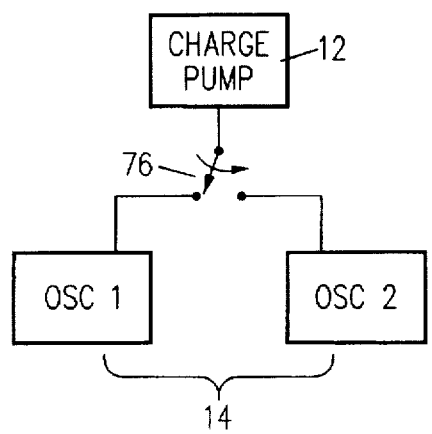
FIG. 6 is a block diagram illustrating the switching between a high frequency and a low frequency oscillator.

In another embodiment of oscillator 14, shown in FIG. 6, two oscillators, OSC1 and OSC2, are used, and the control signal on line 74 controls a switch 76 which connects the charge pump 12 switching transistors to either the high frequency signals provided by OSC1 (for the normal operating mode) or the low frequency signals generated by OSC2 (for the low power consumption mode).

Oscillator 14 could be a ring oscillator or any other known form of oscillator. If oscillator 14 were a ring oscillator, one or more inverters in the ring would be bypassed for high frequency operation.

Techniques to detect whether a low power consumption mode should be initiated are described later.

Figure 7:
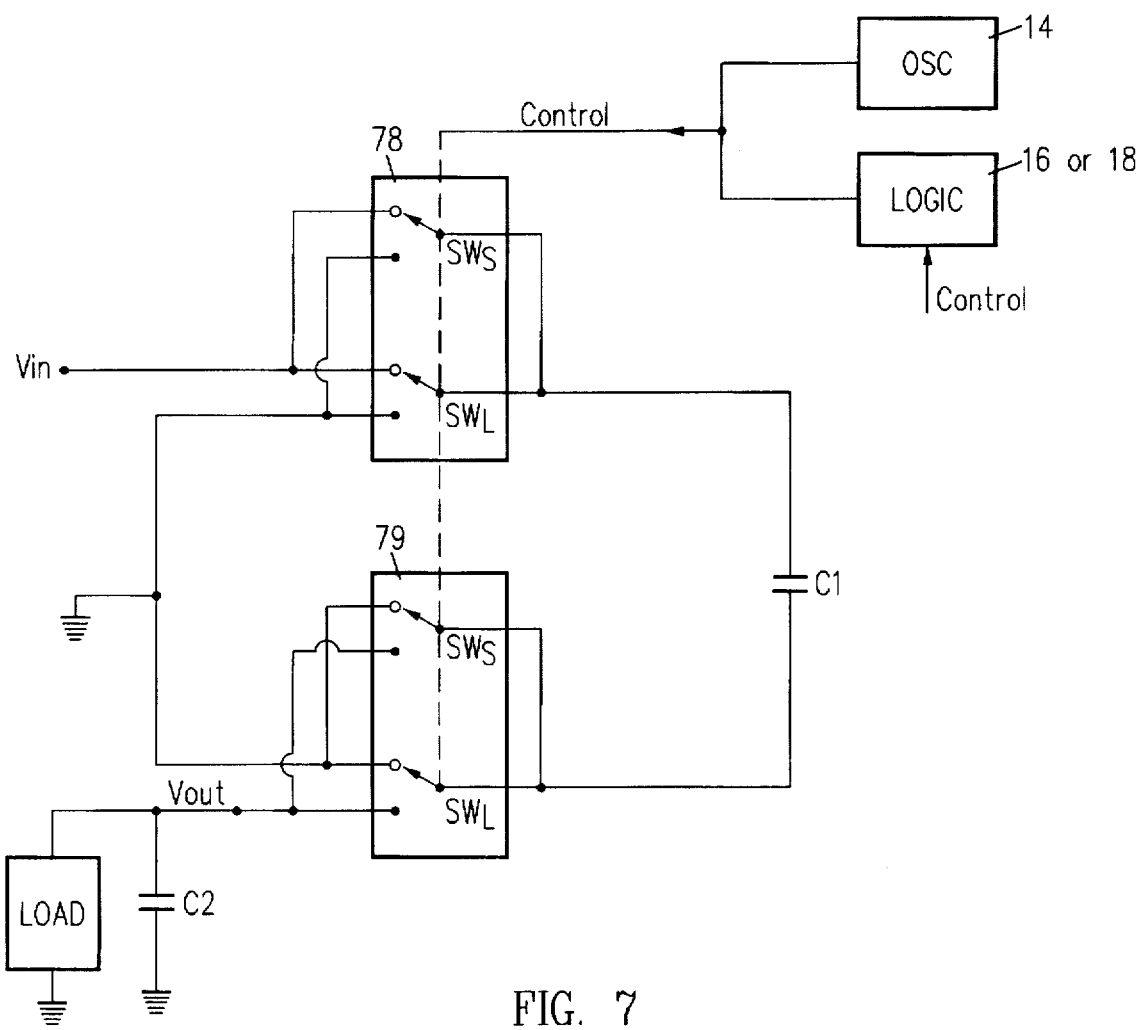
FIG. 7 illustrates a transistor switch which may be used as a transistor switch in the charge pump of FIG. 2 which, in one setting, operates in a normal operating mode and, in another setting, operates in a low power consumption mode.

Another method to reduce the power consumption of charge pump 12 is to lower the effective capacitances of one or more of the switches used within charge pump 12. This is illustrated in FIG. 7. FIG. 7 depicts switches 78 and 79 which may substitute for switches $SW_1$ and $SW_2$, respectively, in the charge pump of FIG. 2 or in any conventional charge pump. Switches 78 and 79 consist of a large switching transistor $SW_L$ and a small switching transistor $SW_S$, where the larger transistor has a parasitic capacitance which is larger than that of the smaller transistor. Thus, the larger transistor draws more current from the battery than the small transistor when their respective gates are charged, assuming the transistors are MOS transistors. Switches $SW_L$ and $SW_S$ may also be bipolar transistors whose parasitic capacitances are also related to their sizes.

In a normal operating mode, both switches $SW_S$ and $SW_L$ are operated in parallel to connect the terminals of capacitor C1 to either $V_{IN}$/ground or ground/$V_{OUT}$.

When a low power consumption mode is initiated, logic circuit 16 or 18 in FIG. 1 disconnects the control terminal of switch $SW_L$ from the oscillator 14, or otherwise disables switch $SW_L$, to cause switch $SW_L$ to act as an open circuit. The switch $SW_L$ may be disabled by a switch connected between the control terminal of switch $SW_L$ and oscillator 14 or by any other suitable technique. If switch $SW_L$ is normally closed, then logic circuit 16 or 18 would also act to disconnect switch $SW_L$ from the circuit so that only the smaller switch $SW_S$ operates to couple the terminals of capacitor C1 to the proper nodes. In one embodiment, the larger switches $SW_L$ are 10 to 20 times greater in size (channel width) than the smaller switches $SW_S$; however, other ratios would also be suitable. In one embodiment, the larger switches $SW_L$ have a channel width of 6000 microns and a channel length of 6 microns, for PMOS switches, and a width of 3000 microns and a length of 6 microns for the NMOS switches. Many factors determine the preferred size of the transistors for a particular application, such as:

Technology choice: $L_{min}$=5µ for high voltage CMOS vs. $L_{min}$=1µ mid-voltage CMOS;

Voltage requirement: e.g., 10 volt vs. 25 volt;

Output reservoir capacitors: e.g., 0.1 µF vs. 10 µF.

In another embodiment, switches $SW_L$ and $SW_S$ do not operate in parallel but operate in an either/or configuration where only one or the other is used to couple the voltage to the top terminal of capacitor C1. This may be accomplished by placing another switch in series between the oscillator 14 and the control terminal of switch $SW_S$ to selectively disable either switch $SW_L$ or $SW_S$.

Figure 8:
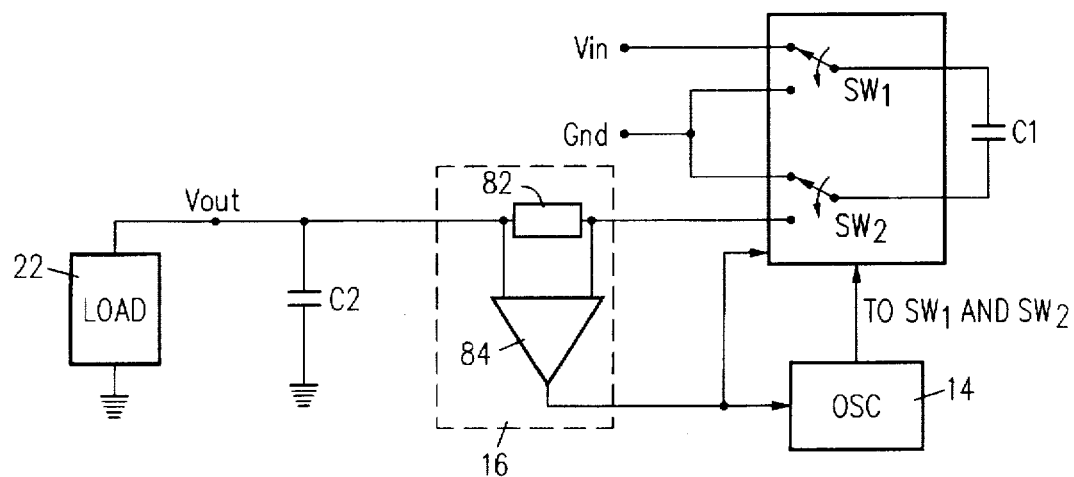
FIG. 8 is a schematic diagram of a DC to DC converter illustrating automatic detection circuitry which triggers the onset of a low power consumption mode of the converter.

FIG. 8 illustrates one construction of logic circuit 16 which automatically detects a low output current being drawn by load 22 connected to one output of the converter 10 of FIG. 1. An impedance 82, such as a resistor, is connected in series between the load 22 and charge pump 12 such that the current drawn by load 22 flows through the impedance 82. Impedance 82 may instead be on the left side of capacitor C2 but would then be outside of the integrated circuit and require extra pins.

A comparator 84 senses if the differential across the terminals of impedance 82 is below a threshold level, indicating that the current through impedance 82 is low enough to allow the charge pump 12 to provide the required power to load 22 even in the low power consumption mode. The logic state then output by comparator 84 is applied to oscillator 14 to lower the frequency of oscillator 14, as previously described with respect to FIGS. 5 and 6, or applied to charge pump 12 to cause the switching transistors to be in their low power consumption mode, as previously described with respect to FIG. 7. Various other logic circuits are envisioned which detect a current through impedance 82 and generate a predetermined logic signal if this current is below a threshold amount.

Logic circuit 18 in FIG. 1 may be a simple circuit which receives a predetermined voltage at terminal P1 and converts this signal, if necessary, to the appropriate logic level on control line 74 to cause oscillator 14 to be operated at a low frequency or to cause the switching transistors in charge pump 12 to be in their low power consumption mode. In one embodiment, logic circuit 18 may be eliminated, and the control signal to oscillator 14 or charge pump 12 may be obtained directly from terminal P1.

Figure 9:
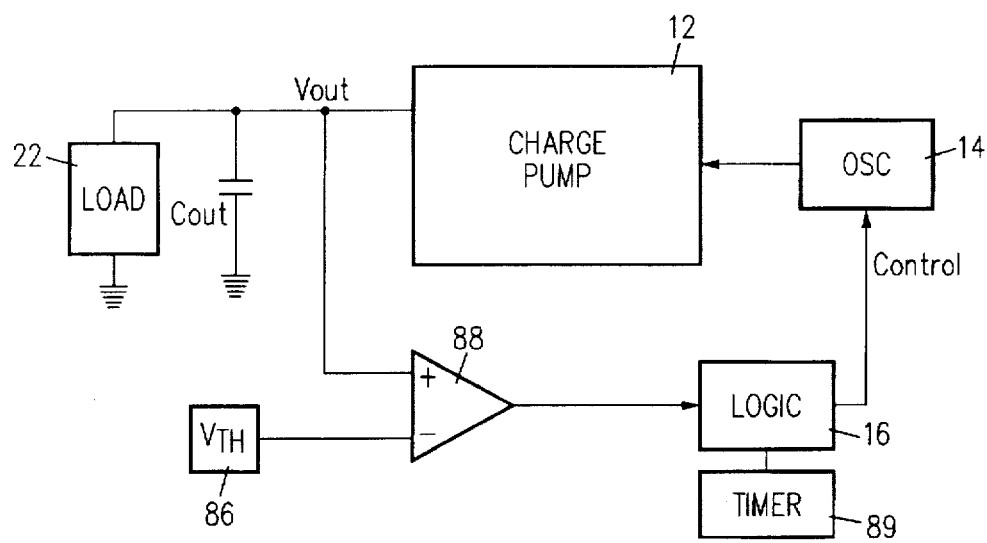
FIG. 9 illustrates another embodiment of the converter which automatically selects either a normal operating mode or the low power consumption mode depending on whether the output voltage is below a threshold voltage.

FIG. 9 illustrates another embodiment of the invention where the output voltage $V_{OUT}$ across the output capacitor $C_{OUT}$ is sensed and compared to a threshold voltage 86 by a comparator 88. If the output voltage is above or at the threshold voltage, indicating that the charge pump 12 is providing the required current to the load 22, the output of comparator 88 provides a logic level to logic circuit 16 signifying that a low power consumption mode may be appropriate. After any predetermined time delay (including zero delay) provided by timer 89, logic circuit 16 then controls oscillator 14 to decrease its frequency or controls the switching transistors in charge pump 12 to be in their low power consumption mode.

If the current provided by charge pump 12 is insufficient to power load 22, the output voltage $V_{OUT}$ will become lower than the threshold voltage 86, and comparator 88 will signal logic circuit 16 to place oscillator 14 or charge pump 12 in its normal operating mode. Converting to the normal operating mode will then raise the output voltage $V_{OUT}$ above the threshold voltage, and the necessary current will be provided to the load 22. After a predetermined amount of time, such as zero to one millisecond, depending on the application requirement as well as loading and supply conditions, logic circuit 16 will then automatically cause converter 10 to operate in its low power consumption mode. The cycling between the normal operating mode and the low power consumption mode then continues.

The threshold voltage may be obtained from any node in charge pump 12 which is related to the output voltage. A divider circuit may be inserted between $V_{OUT}$ and comparator 88 to divide $V_{OUT}$ into a suitable range for comparison with the threshold voltage.

In one embodiment, the oscillating frequency provided by oscillator 14 is continuously variable to cause the output voltage to just meet the threshold voltage.

The circuit of FIG. 9 operating in the normal operating mode for a predetermined time may be referred to as a burst mode of operation. Generally, it is envisioned that this burst mode will be operated for a relatively short time compared to the low power consumption mode.

In another embodiment, the time delay incurred before logic circuit 16 switches to a low power consumption mode is variable and is based on the time it takes for the output voltage to fall below the threshold voltage when converter 10 is in the low power consumption mode. If the time span is short, indicating that load 22 is drawing a relatively high current, then the time delay between cyclings between modes can be increased.

The techniques described herein can reduce the operating current of converter 10 significantly, such as by greater than 99%. For a typical converter, the normal operating current may be 1 mA to 10 mA, while the low power consumption operating current may be as low as 5 μA to 50 μA.

In an alternative embodiment, a reduced power consumption mode and a low power consumption mode are made available to converter 10, depending on the load requirements, by using an oscillator with multiple selectable frequencies (e.g., three or more) or by using switching transistors with multiple selectable power consumption modes (e.g., three or more).

FIG. 10 is a block diagram of a packaged integrated circuit 92 containing converter 10 of FIG. 1 as well as buffers 94 and 96. Buffers 94 and 96 receive an input signal on transmit pin T and receive pin R and output a voltage +V or −V on output pins of the integrated circuit 92. The various transfer and reservoir capacitors used by converter 10 are shown external to package 92. The various circuits described in FIGS. 1–9 or a combination of such circuits may be incorporated into converter 10 to provide both a normal operating mode and a low power consumption mode. The circuit of FIG. 10 may be used as an RS-232 family of transceivers.

Accordingly, various embodiments of an integrated circuit DC to DC converter having a low power consumption mode have been described. The low power consumption mode may be initiated automatically or by an externally generated signal. Such automatic detection or externally generated signal may designate a low power consumption mode, a complete shut down mode, or other mode.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An integrated single-chip circuit comprising:

a switching charge pump which receives a first voltage from a power supply and outputs a second voltage different from said first voltage, said charge pump incorporating switching transistors which draw an operating current from said power supply;

an oscillator connected to said switching transistors within said charge pump for controlling an operating frequency of said charge pump; and a low power consumption detection circuit for detecting when a low power consumption mode of said charge pump is appropriate and, in response to such detecting, for causing said switching transistors in said charge pump to draw less current from said power supply, said low power consumption detection circuit comprising:

an impedance in series between a load and a terminal of said charge pump, wherein a current through said load is reflected by a current through said impedance; and a detector for determining a voltage drop across said impedance and for generating a signal reflecting whether a current into said load is below a threshold current.

2. The circuit of claim 1 wherein said low power consumption detection circuit receives a first signal and causes an operating frequency of said charge pump to be lowered.

3. The circuit of claim 1 wherein said low power consumption detection circuit is connected to said charge pump and controls said switching transistors within said charge pump to have a lower effective capacitance so as to draw less current from said power supply during each switching cycle of said charge pump.

4. The circuit of claim 3 wherein said charge pump comprises two or more capacitors controllably connected together by said switching transistors operating at the operating frequency of said charge pump, wherein one or more of said switching transistors comprise:

a first switching transistor and a second switching transistor connected in parallel during a normal operating mode and not connected in parallel during said low power consumption mode, said first switching transistor being larger than said second switching transistor.

5. The circuit of claim 3 wherein said charge pump comprises two or more capacitors controllably connected together by said switching transistors operating at the operating frequency of said charge pump, wherein one or more of said switching transistors comprise:

a first transistor and a second transistor, said first switching transistor being larger than said second switching transistor, said first switching transistor being enabled when providing a switching function at said operating frequency in a normal mode of said charge pump, said second switching transistor being enabled, while said first switching transistor is disabled, for providing a switching function at said operating frequency during said low power consumption mode of said charge pump.

6. The circuit of claim 1 wherein said charge pump comprises two or more capacitors controllably connected together by said switching transistors operating at said operating frequency of said charge pump, wherein said two or more capacitors are connected external to an integrated circuit package housing said switching transistors.

7. The circuit of claim 1 wherein said low power consumption detection circuit receives a first signal and causes an operating frequency of said charge pump to be lowered to less than one tenth of the operating frequency of said charge pump during a normal mode of said charge pump.

8. The circuit of claim 7 wherein said low power consumption detection circuit also receives a second signal and causes said operating frequency of said charge pump to be lowered to a frequency lower than said operating frequency during said low power consumption mode.

9. The circuit of claim 1 wherein said low power consumption detection circuit receives a first signal and causes an operating frequency of said charge pump to be lowered to less than one hundredth of the operating frequency of said charge pump during a normal mode of said charge pump.

10. The circuit of claim 1 wherein said switching transistors are MOS transistors.

11. The circuit of claim 1 wherein causing said switching transistors in said charge pump to draw less current from said power supply comprises lowering said operating frequency of said charge pump.

12. The circuit of claim 1 further comprising one or more buffers on the same integrated circuit chip as said charge pump, said one or more buffers being powered by an output voltage of said charge pump, said one or more buffers having an input pin and an output pin extending from an integrated circuit package housing said charge pump.

13. The circuit of claim 12 wherein said circuit is configured as an RS-232 transceiver.

14. The circuit of claim 1 wherein said oscillator comprises two or more oscillators, each of said oscillators generating a different frequency.

15. The circuit of claim 1 wherein said low power consumption detection circuit comprises:

a comparator for comparing a first voltage representative of an output voltage of said charge pump with a threshold voltage and, upon detection of said first voltage being greater than said threshold voltage, controlling said switching transistors in said charge pump to draw less current from said power supply.

16. The circuit of claim 15 further comprising a timer for causing said charge pump to be switched into said low power consumption mode after a period of time after said first voltage is detected as being above said threshold voltage.

17. The circuit of claim 16 where said period of time is based on a time it takes for said first voltage to fall below said threshold voltage when said charge pump is in said low power consumption mode.

18. A method for lowering the power consumption of a switching type charge pump comprising the steps of:

receiving a voltage from a power supply into said charge pump;

detecting the onset of a low power consumption mode by passing current flowing from said charge pump into a load through an impedance in series between said load and a terminal of said charge pump, wherein the current through said load is reflected by the current through said impedance, determining a voltage drop across said impedance and generating a signal reflecting whether said current into said load is below a threshold current;

controlling an oscillator to output an operating frequency in response to said detecting;

driving switching transistors within said charge pump with said operating frequency; and causing said switching transistors within said charge pump to draw less current from said power supply connected to said charge pump by changing said operating frequency of said oscillator.

19. The method of claim 18 wherein said step of causing said switching transistors within said charge pump to draw less current from said power supply comprises of the step of:

lowering an operating frequency of said switching transistors.

20. The method of claim 19 wherein said step of lowering said operating frequency of said switching transistors comprises the step of reducing said operating frequency of said switching transistors to less than one-tenth the operating frequency in a normal mode of operation to place said charge pump in said low power consumption mode.

21. The method of claim 18 wherein said switching transistors comprise first type switching transistors and second type switching transistors, said first type being larger than said second type, and wherein said step of causing said switching transistors within said charge pump to draw less current from said power supply comprises the step of disabling said first type switching transistors in said charge pump while allowing said second type switching transistors in said charge pump to controllably connect together two or more capacitors in said charge pump for generating a charge pump output voltage.

* * * * *